United States Patent [19]

Iskiyan et al.

[11] Patent Number: 5,428,796
[45] Date of Patent: Jun. 27, 1995

[54] SYSTEM AND METHOD FOR REGULATING ACCESS TO DIRECT ACCESS STORAGE DEVICES IN DATA PROCESSING SYSTEMS

[75] Inventors: James L. Iskiyan; Brent C. Beardsley; Michael T. Benhase; Cortland D. Starrett; John R. Wolfe, all of Tucson, Ariz.

[73] Assignee: International Business Machines Corporation, Armonk, N.Y.

[21] Appl. No.: 936,151

[22] Filed: Aug. 26, 1992

[51] Int. Cl.6 .............................................. G06F 13/14
[52] U.S. Cl. ....................................... 395/725; 395/425
[58] Field of Search ................. 395/325, 425, 725, 275

[56] References Cited

U.S. PATENT DOCUMENTS

| | | | |
|---|---|---|---|
| 4,162,529 | 7/1979 | Suzuki et al. | 395/650 |
| 4,223,380 | 9/1980 | Antonaccio et al. | 395/200 |
| 4,232,294 | 11/1980 | Burke et al. | 340/147 |
| 4,404,628 | 9/1983 | Angelo | 395/200 |
| 4,415,970 | 11/1983 | Swenson et al. | 364/200 |
| 4,482,954 | 11/1984 | Vrielink et al. | 395/725 |
| 4,488,217 | 12/1984 | Binder et al. | 395/375 |
| 4,504,906 | 3/1985 | Itaya et al. | 395/325 |
| 4,574,350 | 3/1986 | Starr | 395/725 |
| 4,628,445 | 12/1986 | Buonomo et al. | 395/275 |
| 4,716,528 | 12/1987 | Crus et al. | 395/650 |
| 4,742,348 | 5/1988 | Wagner | 340/825.5 |
| 4,796,176 | 1/1989 | D'Amico et al. | 395/275 |
| 4,805,106 | 2/1989 | Pfeifer | 395/650 |
| 4,829,467 | 5/1989 | Ogata et al. | 364/900 |
| 4,914,653 | 4/1990 | Bishop et al. | 370/85.6 |
| 4,937,733 | 6/1990 | Gillett, Jr. et al. | 395/325 |
| 5,202,973 | 4/1993 | Ramanujan et al. | 395/425 |

FOREIGN PATENT DOCUMENTS

| | | | |
|---|---|---|---|
| 0267464 | 10/1987 | European Pat. Off. | G06F 13/14 |
| 0303855 | 7/1988 | European Pat. Off. | G06F 13/12 |
| 1389066 | 3/1972 | United Kingdom | G06F 13/00 |

*Primary Examiner*—Jack B. Harvey
*Assistant Examiner*—Glenn A. Auve
*Attorney, Agent, or Firm*—H. St. Julian; Andrew J. Dillon

[57] ABSTRACT

A data processing system regulating access from a plurality of host computers to a plurality of direct access storage devices. The data processing system has a storage controller connected for data communication to the host computers by one or more channels per host computer. The storage controller is further connected to direct access storage devices used to provide auxiliary storage. The storage controller, responsive to host computer request, selectively establishes a communication link for data transfer between the host computers and the direct access storage devices. Channels are temporarily disqualified from obtaining control of the storage controller or a storage device during periods of contention for access to the storage devices or the storage controller. Transmission of device end and control unit end signals is also selective by channel. Override conditions are specified to allow for host computer or channel failure without disabling the data processing system.

38 Claims, 8 Drawing Sheets

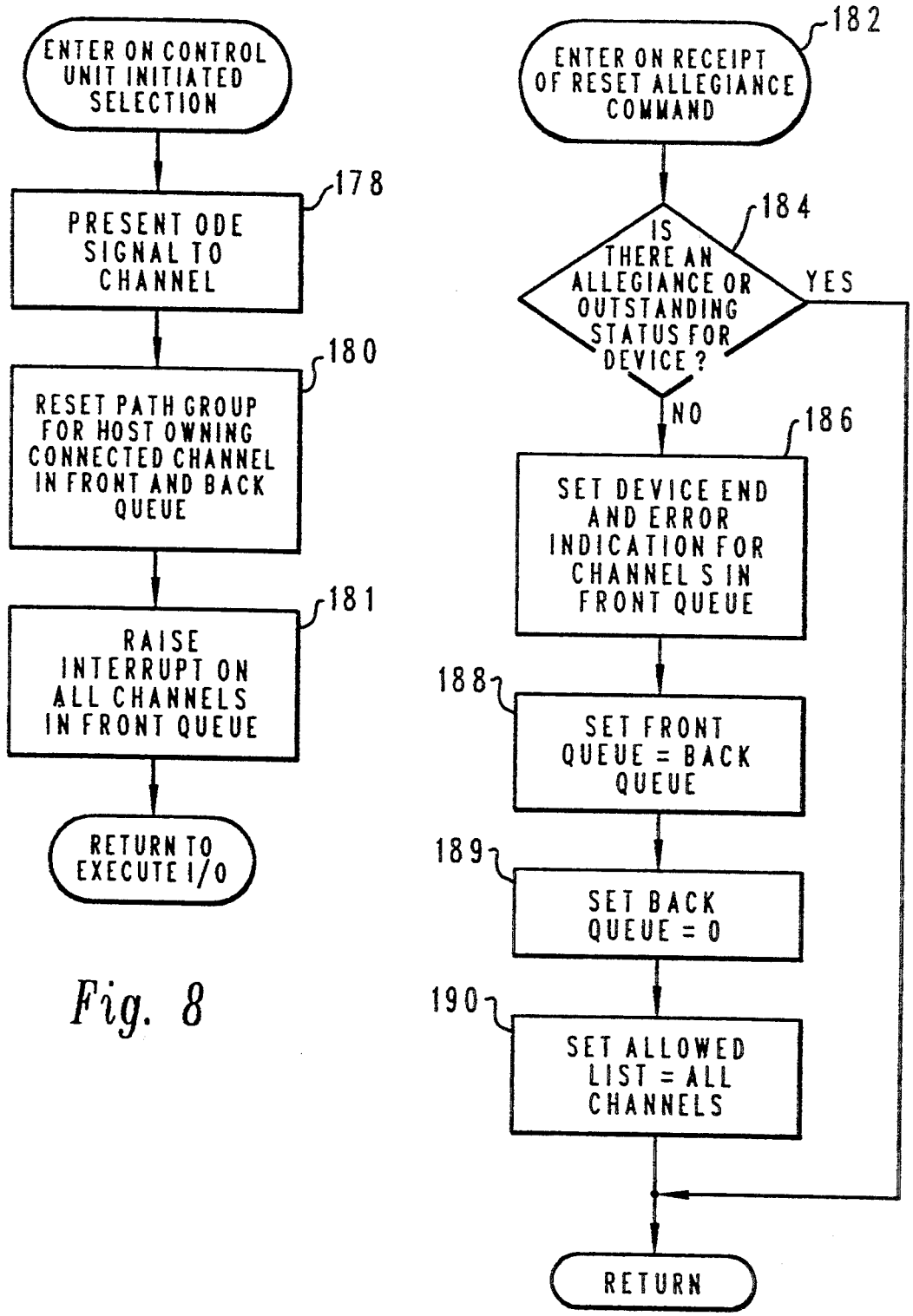

SYSTEM AND METHOD FOR REGULATING ACCESS TO DIRECT ACCESS STORAGE DEVICES IN DATA PROCESSING SYSTEMS

BACKGROUND OF THE INVENTION

1. Technical Field

The invention relates to data storage systems for data processing systems, and more particularly relates to controllers for disk drives serving a plurality of host main frame computers.

2. Description of the Related Art

Main frame computer systems generally use auxiliary storage devices for mass storage of data. Direct Access Storage Devices (DASD) are one such type of auxiliary storage device. A direct access storage device is one in which access time is effectively independent of the location of data in the storage device. Direct access storage devices may be located externally to a host main frame computer and can serve several computers. Data integrity requires that only one computer use or own a direct access storage device at a time. The system designer must provide for resolution of conflict between the computers for access to the storage device.

One common type of direct access storage device is the magnetic disk unit, which includes a disk drive, magnetic transducers for writing data to and reading data from the disk drive and associated controls for positioning the transducers, among other tasks. For applications such as data base storage, several magnetic disk units may be grouped together, and a storage controller logically positioned between the group and several independent computers. The storage controller handles connection and disconnection between a particular computer and magnetic disk unit. It is to the storage controller that the task of resolution of conflicting demands of host computers for magnetic disk units falls.

The IBM 3990 storage controller is an example of a storage control unit used to handle connections between selected members of a group of magnetic disk units and computers requesting connection. The IBM 3990 Model 3 type controller, which is available from IBM Corporation, can handle up to sixteen channels from host computers and up to sixty-four magnetic storage units. Within the storage controller are two multipath storage directors and four storage paths, two of which are associated with each multipath storage director. Each multipath storage director may be connected to up to eight incoming channels from host computers, for a total of sixteen channels for the storage controller as a whole. Each multipath storage director is connected to two storage paths, thus functioning as an 8×2 switch. Channels are physical links between the storage controller and the host computers. Usually, a host computer has two or four channels, half being physically connected to the one multipath storage director and the other half being connected to the other multipath storage director.

Each storage path is connected to all of the available magnetic disk units. Upon indication that a disk is ready, the controller can secure any one of a plurality of the channels and storage paths back to a host to establish a data path. It is a feature of the IBM 3990 storage controller that an input/output transaction between a host computer and a magnetic disk unit may be broken into two separate connections, which may be handled along distinct channels and storage paths. A request need not be responded to over the same channel on which it was received. This feature increases throughput through the storage controller. While each storage path is in effect a stand alone control unit based upon its own microprocessor, the storage paths share control arrays in a common memory space for synchronization functions relating to handling connections, disconnections and reconnections relating to a transaction.

Several manufacturers, including IBM, Amdahl and Hitachi, supply computers of various models connectable to the IBM 3990 storage controller. These computers differ in operating speeds and in time required to respond to signals from storage controllers. The channels used for connection of the computers to the storage controller may also differ. One type of channel has parallel copper wire paths for transmission of electrical signals. This channel type is used at distances of up to about 125 meters. Serial optical cables are used to connect computers and storage controllers at distances out to 15 kilometers.

A computer requesting connection to a magnetic storage unit that is already in use is given a busy signal and refused connection by the storage controller. Upon the storage unit being released, an Owed Device End (ODE) signal has been sent by the storage controller to all channels that received a device busy signal during the period the device was taken. Similarly, all storage paths in a storage cluster may be occupied by connections between storage units and computers. A computer requesting a connection under these circumstances is given a control unit busy signal. Upon release of one of the connections, all computers having received the busy signal are provided a Control Unit End (CUE) signal. The ODE signal and the CUE signal are akin to starting guns in a race among the computers to take control of the storage director or storage device. Control is granted on a first come, first served basis.

The race is not limited to the entities receiving the CUE and ODE signals. Any of the computers attached to the storage controller may receive control of a storage path or storage device for the asking by being the first to have its request received. Thus the channel which just released a storage path may make a request to regain control of the path.

The conflict resolution regime is not a race among equals. Computers which are faster can respond to the CUE and ODE signals more quickly. Where the channel between computer and storage controller is physically short, the transmission time for the CUE and ODE signals from the storage controller to the computer and the transmission time for a resulting Start Input/Output (SI/O) signal from the computer to the storage controller is commensurately short. Computers advantaged by a short channel may beat far removed computers to the storage controller with a SI/O signal even though they have not received a CUE or ODE signal. The problem caused by this system is that during periods of high demand for access to a data base stored on a group of magnetic storage devices, the slow or more distant computers may be locked out of access to the storage devices by computers which are faster or which have shorter transmission link times to a storage controller.

It is an object of the invention to provide a method of allocating access among computers to storage paths in a storage controller and to direct access storage devices.

It is another object of the invention to prevent lock out of computers from access to either storage paths or to direct access storage devices.

It is still another object of the invention to identify failing host computers.

SUMMARY OF THE INVENTION

The invention provides a system and method in a data processing system of arbitrating access from a plurality of host computers to a plurality of direct access storage devices. The data processing system has a storage controller connected for data communication to the host computers by one or more channels per host computer. The storage controller is further connected to the direct access storage devices. The storage controller, responsive to host computer requests, selectively establishes a communication link for data transfer between the host computers and the direct access storage devices.

The method of the invention provides for temporary disqualification of a host computer from obtaining control of the storage controller or a storage device. The method further provides for selective transmission of device end and control unit end signals by channel. Override conditions are specified to allow for host computer or channel failure without disabling the data processing system.

The method is invoked in response to contention for access to a storage device or to the storage controller between two or more host computers. A device contention period begins with a request by a host computer for connection to a storage device when the storage device is not available. A controller contention period begins whenever the storage controller is not available for connection of the host to a storage device. Storage controller response to a request for connection over a channel during the respective contention periods is governed, in part, by a plurality of status indications relating to the channels. With respect to a given channel, status indications are generated during each contention period. A contention period is terminated with simultaneous satisfaction of all requests for connection. Provision is also made for abnormal termination.

Prior to initiation of either type of contention period, a plurality of data structures or variables are initialized for use during the contention period. For regulation of controller contention, a data structure is provided for listing all channels with outstanding, untilled requests for connection to the storage controller. There is a variable called a control counter and is provided for each channel. A control counter is reinitialized each time its channel obtains a connection. The control counter for a channel is indexed each time a channel disconnection from the storage controller occurs, if an outstanding request for connection exists from its channel.

After indexing the control counters, each control counter is compared to each of three index levels. The levels progressively reached are a preferred level, block demand level and a failure level. If the control counter for a channel reaches the failure level it is reinitialized. If the control counter reaches a block demand level, a control unit block mask is set. The control unit block mask is a map of channels whose control counters have not reached the block demand level. The storage controller responds to a request for connection from a blocked channel with a busy signal. If the control counter for a channel reaches the preferred level, a control unit end mask is set to indicate a status qualifying the channel for a control unit end signal upon a disconnection from the storage controller. Whenever the control unit end mask is nonzero, only channels with control counters at the preferred level or higher receive control unit end signals, indicating availability of the storage controller.

The block mask is overridden at times. A counter tracks the number of times a start input/output request is received without execution of an input/output operation. Upon receipt by the storage controller of a start input/output message, i.e. a request for connection to a storage device for data transfer, the storage controller determines if the requesting channel is blocked from storage controller access. If not, the counter tracking repetitions of denial of connection is cleared and the control counter for the channel requesting connection is also cleared. Normal processing of the channel request then occurs.

Where the block mask blocks the selecting channel, the channel is given a busy signal. The counter tracking the repetitions of blocked requests is indexed and compared to a maximum permitted level. If the maximum level has been reached, the repetition counter and the control counters for all the channels are cleared. The block mask is reset to zero. Processing is returned to a base operation.

To handle device contention periods additional data structures are generated and referred to by the storage controller in responding to requests for connection. Each storage device has its own set of data structures. In handling device contention, two queues are maintained for recording the channels owed a device end signal. A front queue includes channels which are always served before any channels recorded in a back queue. In addition, a call list is maintained which indicates the channels allowed connection to a storage device at any given instant of time and those which are not. Initially, all channels in the call list have allowed status. The front and back queues are empty (expressed as being equal to zero).

Upon receipt by the storage controller of a start input/output request to a storage device, the call list for that storage device is referred to to determine if the channel presenting the request has allowed status. If a channel is allowed the storage controller then determines if the device requested is available. If not, an entry for the channel is made to the front queue indicating an owed device end.

Upon completion of an I/O operation, implying impending release of the storage device, the front queue is examined to determine if the front queue is empty. If not, the channel ending the I/O operation is changed in status to disallowed. Where other channels are associated with the same host computer (a path group), they also are changed in status to disallowed. Any further connection request received from a disallowed channel results in a listing of the request in the back queue until all front queue items have been cleared.

Upon processing of all items in the front queue, the back queue is promoted to the front queue and reset. Further responsive to completion of all requests in the front queue, the call list is reset to allow all channels.

Upon release of the storage device, the storage controller raises an interrupt on all channels listed in the front queue. A device end signal is then presented to the first channel responding to the interrupt. The front and back queues are then reset by removal of the channel or its path group to which the device end was presented.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 8 is a logical flow chart illustrating a programmed response of the storage controller to a control unit initiated selection; and FIG. 9 is a logical flow chart illustrating an error protection routine.

DETAILED DESCRIPTION OF THE INVENTION

Figure 1:
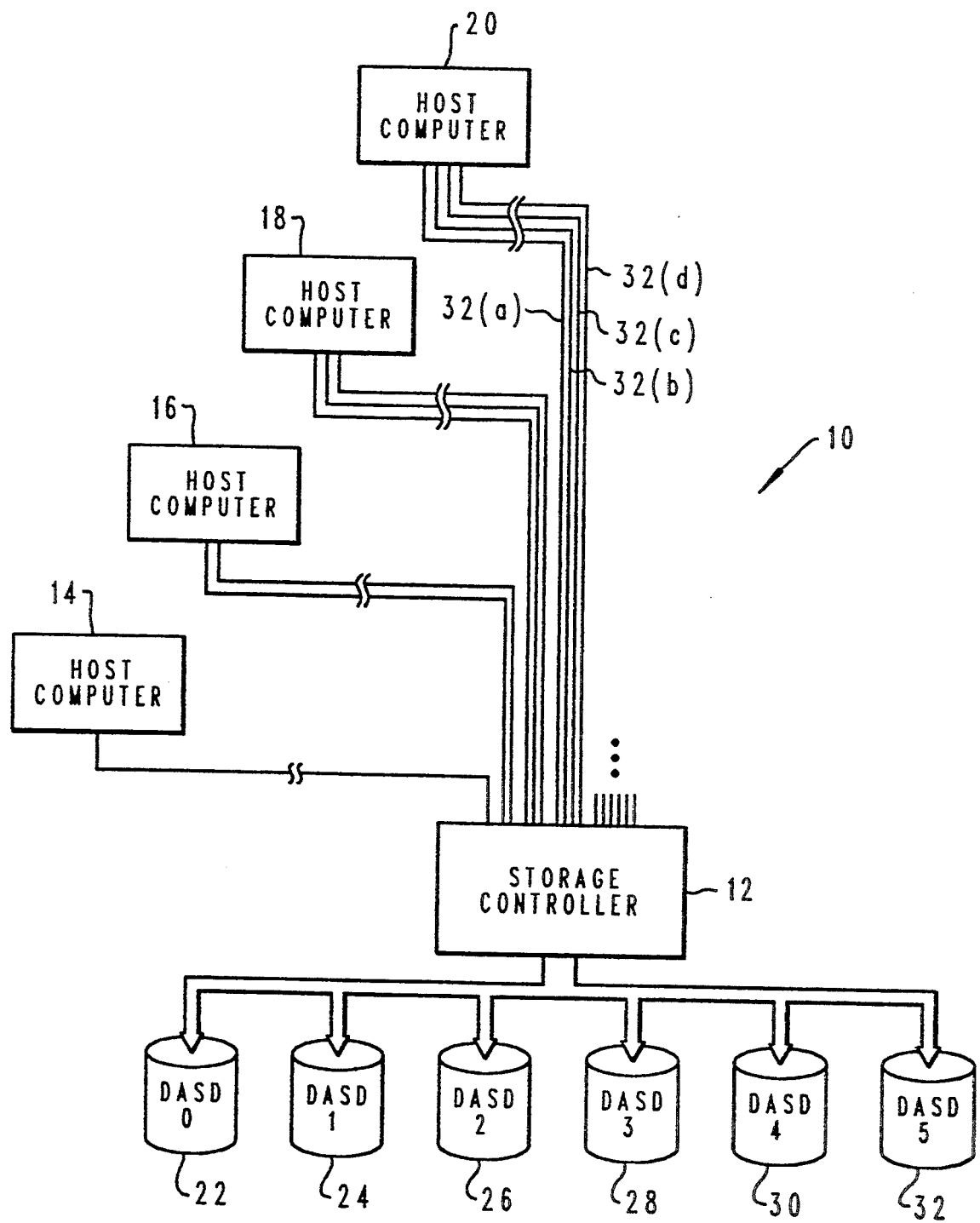
FIG. 1 is a high level block diagram of a data processing system which may be utilized to implement the method and system of the present invention.

With reference now to the figures and in particular with reference to FIG. 1, there is depicted a high level block diagram of a data processing system 10. Data processing system includes a storage controller 12, a plurality of host computers 14, 16, 18 and 20 and a plurality of direct access storage devices (DASD) 22–32. Direct access storage units 22–32 are generally magnetic storage units, commonly termed "disk drives". Storage units 22–32 are also connected to storage controller 12 for selective connection for communication with host computers. Storage controller 12 is preferably an IBM 3990 Model 3 type controller, which is available from IBM Corporation. Host computers 14–20 are typically main frame systems such as the IBM 3090 or ES9000 Model computer or comparable systems. Host computers 14–20 are connected to storage controller 12 with between one and four channels. For example, host computer 20 is connected to storage controller 12 by channels 34(a), 34(b), 34(c) and 34(d). The channels come in two types, parallel data channels and serial data channels. Certain optical serial channels are used for data transmission up to 15 kilometers. Parallel channels utilize electrical signals and are generally not used at distances of greater than about 125 meters.

Figure 2:
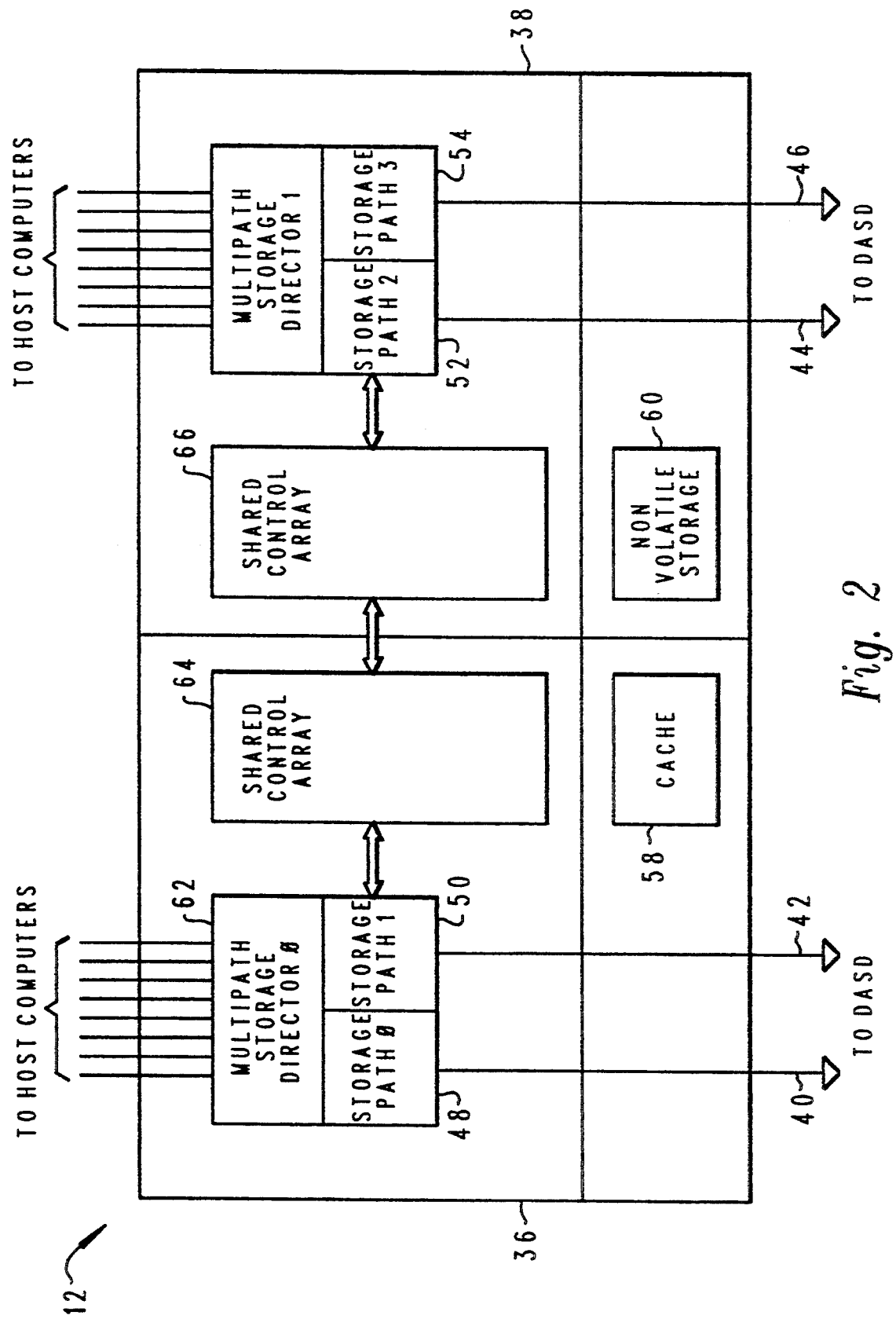
FIG. 2 is a high level block diagram of a storage controller from the data processing system of FIG. 1.

FIG. 2 depicts storage controller 12 in greater detail. Storage controller 12 has two storage clusters 36 and 38, each of which provides for selective connection between a host computer and a direct access storage device. Although four host computer systems and six direct access storage devices are depicted in FIG. 1, storage controller 12 can handle additional channels and direct access storage devices.

Data from a given host computer system may be stored to any of the direct access storage devices. Data may also be recovered from any of the direct access storage devices for a given host computer. Where a host computer is connected by at least two channels, one each is connected to storage clusters 36 and 38. Similarly, where four channels are provided, two are connected to storage cluster 36 and two to the second to storage cluster 38. Storage controller 12 may receive a request from a host computer over a channel, and respond to the request over any one of the channels connected to the same host computer. The channels associated with one host computer are known as a path group. Storage controller 12 has knowledge of the path groups, having received it from each host computer.

Storage controller 12 provides four paths 40, 42, 44 and 48 out to the direct access storage devices. Each data path 40–46 is associated with one of storage path processors 48–54, respectively. Each data path goes to all of the direct access storage devices. Only one data path has access to a direct access storage device at a time however. Because storage controller 12 attempts to synchronize disconnects and reconnects between direct access storage devices and host computers based upon rotational position of a disk in the direct access storage device, storage controller 12 may be seen to operate, in essence, as a data transfer traffic manager.

Storage controller 12 is internally divided into four sections corresponding to independent power supplies. Two sections are storage clusters 36 and 38, respectively. A third section includes a memory cache 58. A fourth section includes a nonvolatile storage 60. Cache 58 provides storage for frequently accessed data. Nonvolatile storage 60 is used for temporary storage of data being written to a storage device in order to provide similar response times for cache writes and cache reads. Storage of data in nonvolatile storage under such circumstances allows indication to a host that the storage operation is logically complete, notwithstanding the fact that actual transfer of the data to a direct access storage device has not yet been completed.

Storage clusters 36 and 38 mirror one another in terms of functional features. Accordingly only storage cluster 36 is described here. Storage cluster 36 includes a multipath storage director 62 which operates as a four or eight by two switch between the channels from the host computer systems and signal path processors 48 and 50. Storage cluster 36 also includes a shared control array 64, which duplicates the contents of shared control array 66 in storage cluster 38. Shared control arrays 64 and 66 store path group information as well as control blocks for the direct access storage devices. They are also used for control of the data structures utilized in practicing the method of the present invention, as described below.

Figure 3:
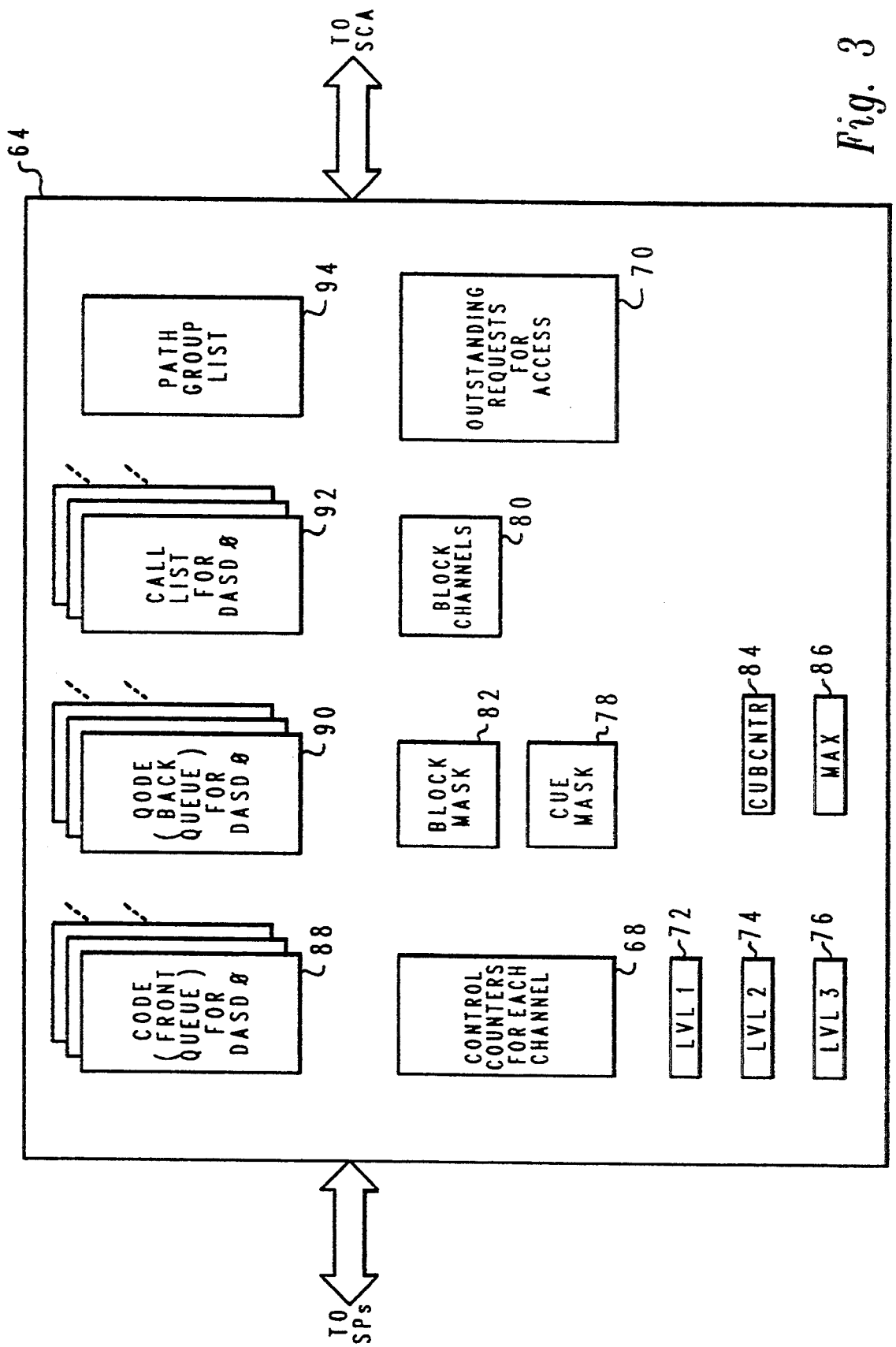
FIG. 3 is a diagram of data structures in a memory utilized in practicing one embodiment of the invention.

FIG. 3 illustrates data structures utilized in practicing the method of the invention stored in shared control arrays 64 and 66. Storage controller 12, by any of signal path processors 48, 50, 52 and 54, can receive and respond to requests by a host computer for access to a direct access storage device. However, while four signal path processors are provided, as many as sixteen computers may be connected to storage controller 12. A signal path processor may handle only one data communications link at a time, and accordingly a host computer may from time to time attempt access to a direct access storage device only to find all of the signal path processors of storage controller 12 busy. At times a signal path processor may be available, but two or more host computers may contend for access to a single direct access storage device. Stemming from differences (1) in processing speeds between host computers and (2) in transmission times on the channels between storage controller 12 and the host computers, one or more host computers may have an advantage in gaining access to the direct access storage devices 22–32 potentially resulting in greatly reduced performance by one or more of the remaining main frame computers in data processing system 10.

The system and method of the invention are directed to regulating access by host computers 14–20 both to storage controller 12 and to each of the direct access storage devices 22–32. When a host computer 14 requests access to a direct access storage device which is not available, or to storage cluster 36 when all signal path processors for the cluster are in use, a busy signal is returned on the channel over which the access was requested. Storage controller 12 conventionally tracks these occurrences, and issues signals known as device end signals or control unit end signals whenever a requested device or a signal path processor becomes available, respectively. The invention provides a method for the arbitration of the issuance of device end signals and control unit end signals, and provides for return of busy signals to selected host computers notwithstanding availability of a device or the storage controller requested by the host computer. The method refers to status information for the channels and the storage devices maintained in shared control arrays 64 and 66.

During periods of contention in normal operation, channels denied access to storage cluster 36 are listed in block 70 as being owed a control unit end. Normally, all channels listed in block 70 are issued a control unit end upon release of a signal path 48 or 50. A control unit end signal indicates to the receiving channel that the storage cluster 36 has a signal path processor open. Host computers receiving the control unit end have an advantage over those computers which do not receive the control unit end in capturing the open signal path processor. However, receipt of a control unit end does not guarantee that the host computer will gain control of the storage controller ahead of a host computer not receiving a control unit end. A host computer at the end of a particularly long response time channel(s) may still have considerable difficulty in obtaining such control. A channel is afforded no advantage versus another channel with an outstanding request.

Additional status records for the channels allow more sophisticated schemes of priority. For each channel, during each period of contention of access to storage controller 12, an accumulated count (control counter) of occasions of denial of access to storage controller 12 is maintained in a data structure 68. Control counters in data structure 68 are activated for a channel upon listing of the channel in a block 70. Each release of one of storage path processors 48–54 results in indexing the control counters then active. The counter for a channel is reinitialized whenever the channel obtains access to storage controller 12. The channel itself is removed from block 70, when a control unit end is presented.

After indexing of the active control counters in control counter block 68, a control counter is compared to threshold values labeled LVL 1 72 and LVL 2 74 from shared control array 64. The threshold values constitute preference levels for access to storage controller 12. Prior to interrogation of block 70, control unit end (CUE) mask 78 is checked for entries. A nonzero status of CUE mask 78 overrides outstanding request for access block 70. When CUE mask 78 has entries, only the channels represented by those entries receive a control unit end upon release of a signal path processor in storage controller 12. Upon a control counter for a channel reaching LVL 1, the channel is listed in a control unit end mask 78 by setting a bit in the mask representing the channel. CUE mask 78, being more exclusive than block 70, gives its listed channels an advantage over those channels with mere outstanding requests.

A second, higher level of preference is provided when a control counter reaches LVL 2 from block 74. When a control counter for a channel reaches LVL 2, indicating still more occasions of denial of or failure to give access to a channel with an outstanding request, a bit in a channel block 80 is set high. Block mask 82 is a mirror image of channel block 80. Channel block 80 is referred to upon each receipt of a start input/output (SI/O) (i.e. a request for access). When channel block 80 is nonzero, block mask 82 is referred to to determine if access will be given the channel over which the request was received. If the bit for the channel is high in block mask 82 the channel is denied access. In other words, only channels with control counters at the level of LVL 2 can now obtain access to the storage controller 12. All remaining channels are locked out.

If a channel cannot obtain access after most, if not all, other channels have been locked out of obtaining control of storage controller 12, there is probably something wrong with the channel or its host computer. Repeated failure to obtain control of storage controller 12 results in the control counter for the channel eventually being indexed to LVL3 76. Upon a control counter reaching LVL 3, the control counter is reset to zero.

A block count 84 is kept of consecutive denials of access to storage controller 12 after block mask 82 becomes active. If the count exceeds a maximum value 86, it results in block mask 82 being cleared and the block count and all control counters being reinitialized.

Access to a particular storage device, e.g. storage device 22, during periods of contention for access is handled in a manner similar to an unordered round-robin. In other words, each channel requesting access to a storage device gets access before any channel can get a repeated access. Requests for access by channels are divided between two blocks: a front queue 88; and a back queue 90. All channels in the front queue 88 are allowed access to a storage device before any in the back queue 90 are allowed access. Admission to the front queue 88 is controlled by reference to a call list 92. Initially, all channels are allowed into the front queue 88, in other words, all are listed in call list 92. During a contention period, once a device request is satisfied, the channel is removed from the call list of allowed channels 92. Thereafter, if a request for access is received on the removed channel, a device busy signal is returned to the host computer source of the request and the channel is listed as having an outstanding request by recording it on the back queue 90. Each storage device has its own front queue 88, back queue 90, and call list 92.

A path group list 94 is also maintained in shared control array 64. A host computer may be connected to storage controller 12 by up to four channels. The channels which connect storage controller 12 to any particular host computer constitute a path group. Path groups and their membership are recorded on path group list 94. As previously described, storage controller 12 may be able to respond to a request over a different channel than that on which the request was received. Using the path group information, additions and removals of a channel listing in any of the above data structures may be extended to include list or removal of path group information.

Figure 4:
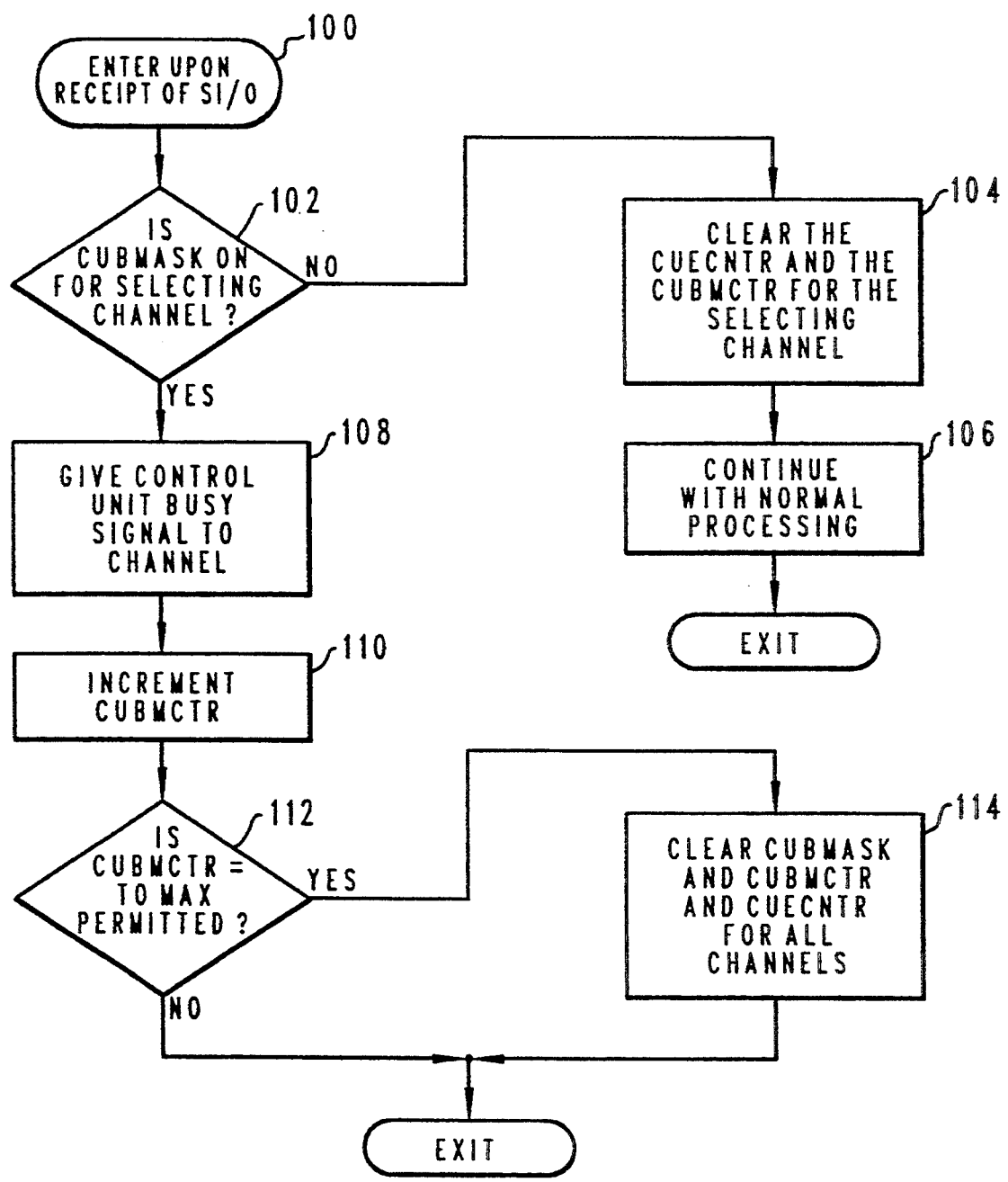
FIG. 4 is a logical flow chart illustrating a programmed response of the storage controller to a start input/output signal from a host computer.

FIG. 4 is a logical flow chart illustrating arbitration of access to storage controller 12 by a host computer over a channel. This process, and those discussed below in connection with FIGS. 5–9, is executed by each storage path processor in storage controller 12. The process is entered at step 100 with receipt of a start input/output command over a selecting (requesting) channel from a host computer. Next, at decision step 102, it is determined if the channel is allowed access to the storage controller by determining if the bit for the channel in the CUBMASK (i.e. block mask 82) is on. If it is not on, the channel can access storage controller 12 and step 104 is executed. With step 104 the control counter (CUECNTR) for the selecting channel is cleared or reinitialized. Step 106 indicates continuation with normal processing, here a connection through to a storage device for input or output operations.

Where the CUBMASK for the channel is on, step 108 follows step 102. With execution of step 108, a control unit busy signal is returned over the channel to the selecting host computer. Next, at step 110 counter (CUBMCTR) is incremented. CUBMCTR 84 is a count of the number of consecutive times a busy status has been given to selecting channels. If no channels are being granted access for input/output operations, CUBMCTR will reach a maximum permitted count, which is detected at step 112. The YES branch from step 112 leads to execution of step 114, where CUBMCTR and the CUBMASK are cleared, as is the control counter (CUECNTR) 68 for all of the channels. In other words, the arbitration scheme is reset giving all channels opportunity to access the storage controller. From step 114 or along the NO branch from step 112 processing is returned to a base procedure of the storage controller.

Figure 5:
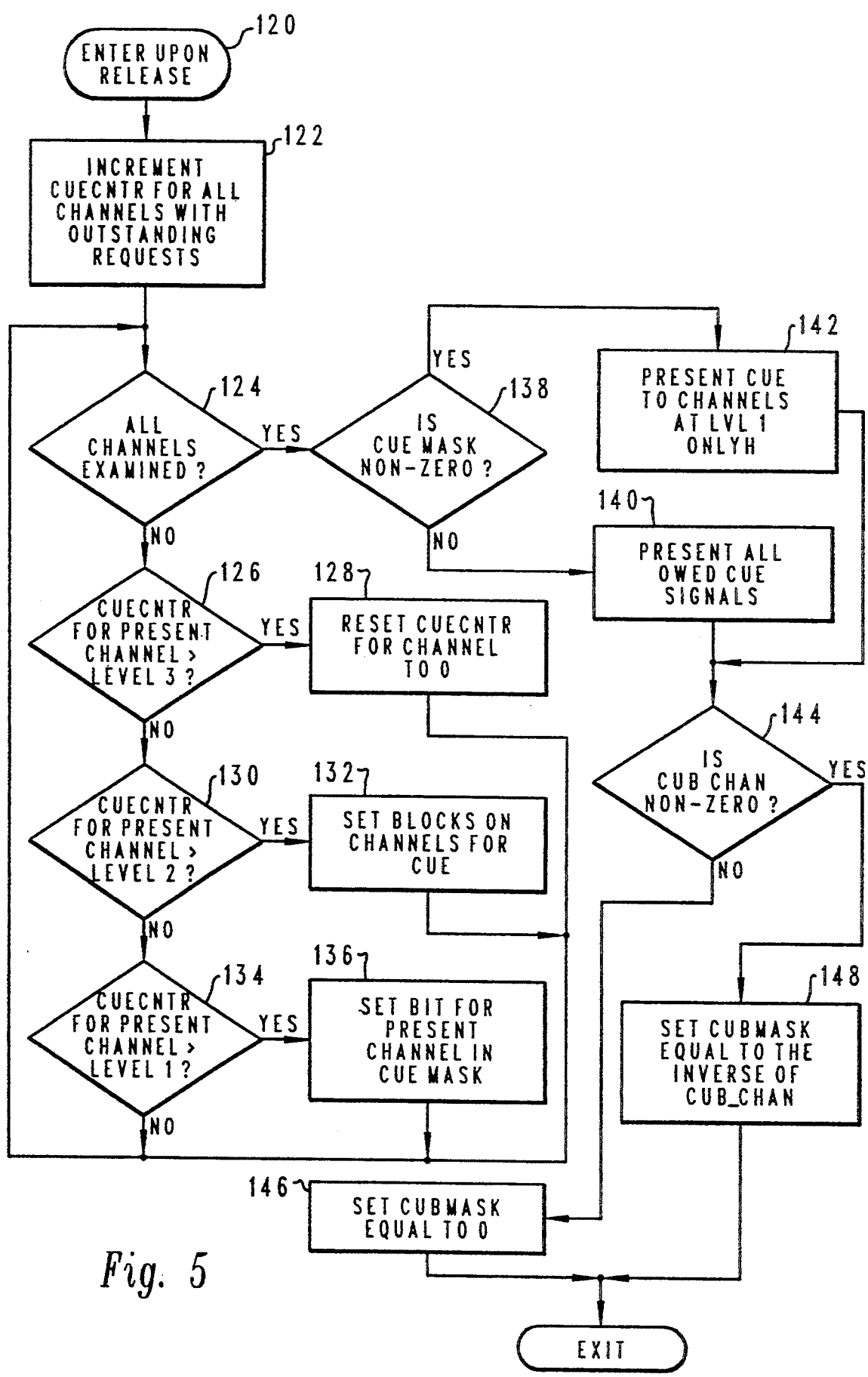
FIG. 5 is a logical flow chart illustrating a programmed response of the storage controller to release of the storage controller by a host computer.

FIG. 5 illustrates a logical flow chart for a process executed by storage controller 12 to resolve contention among channels for access to the storage controller. The process is entered each time a signal path processor of storage controller 12 is released. Next, step 122 is executed to increment a control counter for each channel having an outstanding request for access to the storage controller (i.e. the channels in block 70).

Next, the control counter for each channel is compared against a series of preference thresholds to determine if an operational mode is to be established favoring certain channels for access. Looping through the comparisons is controlled by decision step 124. At step 126 a control counter is compared to the highest threshold level, LVL 3 76, which if met is taken as an error condition. At step 128, executed if LVL 3 76 has been met, the control counter for the channel is reinitialized. If LVL 3 76 is not met, step 130 is executed and the control counter for the channel is compared to the next highest threshold level, LVL 2 74. If LVL 2 is met, all channels for which the control counters are less than LVL 2, are blocked from receiving access. This is keyed by setting bits for those channels having control counters at LVL 2 on in block channel array 80 (step 132). If a control counter for a channel has not met either LVL 3 or LVL 2, at step 134 the control counter is compared to the lowest threshold LVL 1 72. If the counter meets this threshold, a bit representing the channel is set in the CUEMASK 78 (step 136), which is used to determine which channels shall receive a control unit end signal. Along the NO branch from step 134 and from steps 128, 132 and 136 processing is returned to step 124 for looping control.

After the control counters for all of the channels have been compared to the preference thresholds, step 138 is executed to determine if preference is to be given in issuance of control unit end signals, indicating that a signal path processor is available. If no control counters have reached LVL 1 72, CUEMASK will equal zero, and a control unit end signal is presented to all channels with an outstanding request (step 140). A nonzero CUEMASK 78 occurs when one or more bits has been set high in step 136. In this circumstance, only channels at preference level LVL 1 72 receive control unit end signals (step 142).

Next, step 144 is executed to determine if block channel array 80 is nonzero. If it is not, step 146 is executed to set the control unit block mask 82 equal to zero. If array 80 is nonzero, step 148 is executed to set control unit block mask 82 equal to the inverse of the array 80. The sub process is then exited.

Figure 6:
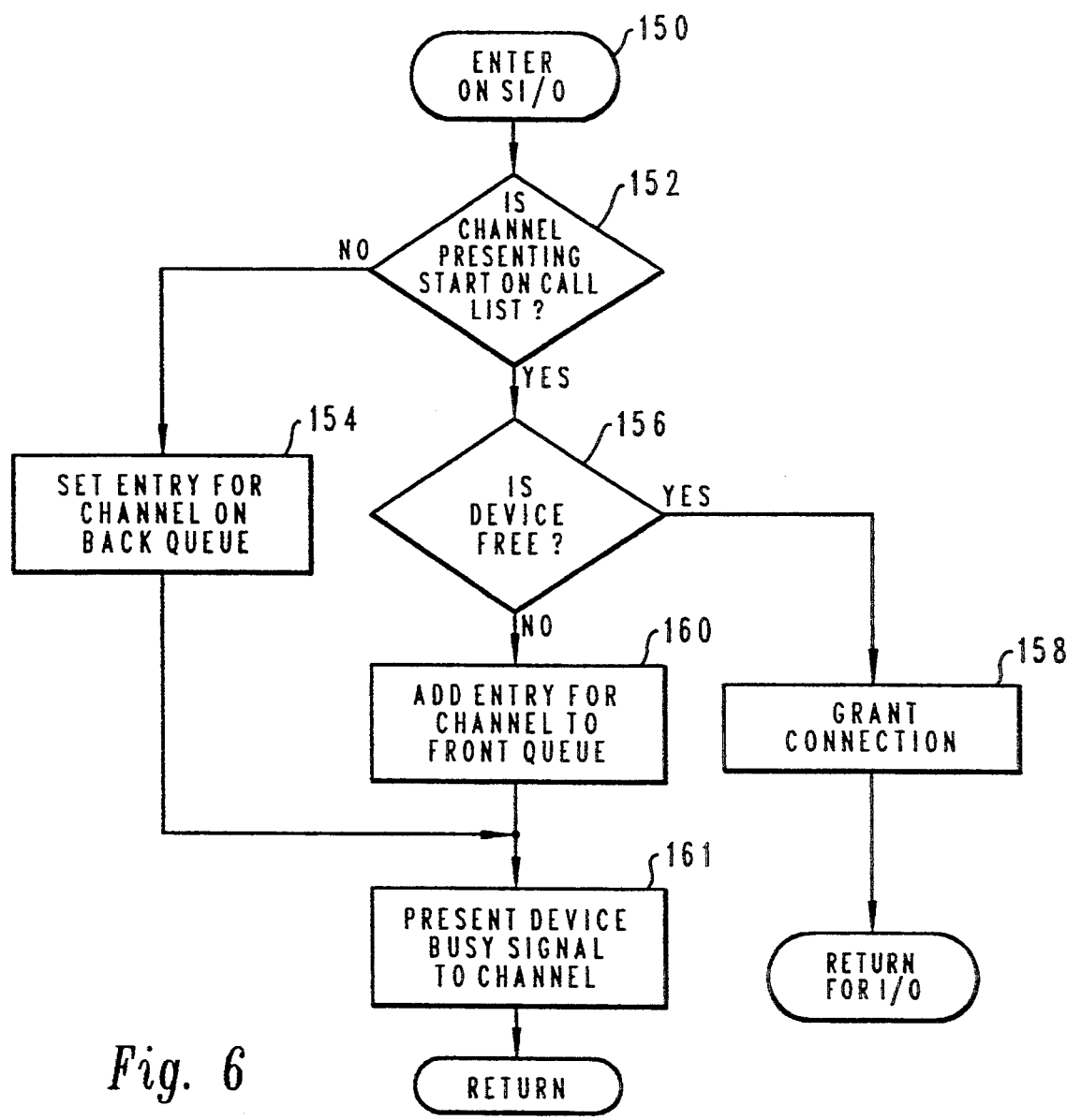
FIG. 6 is a logical flow chart illustrating a programmed response of the storage controller to a start input/output signal as it relates to a direct access storage device from a host computer.

Arbitration of access to each of the storage devices is separately provided, although resolution of contention for such access follows identical procedures. FIG. 6 illustrates a logical flow chart for a process handling arbitration of access to a single storage device. Upon receipt (step 150) by any of the signal path processors of storage controller 12 of a start I/O signal for a storage device, step 15:2 is executed to determine if the channel on which the start I/O has been presented is an allowed channel (i.e. does it appear on call list 92). If the requesting channel is not on the call list (the NO branch from step 15:2), the channel is listed on back queue 90 (step 154). If a channel is listed in call list 92 it is allowed to access the associated storage device, if the device is available (step 156). If the storage device is free (the YES branch from step 156), access to the storage device is granted (step 158). If the device is not free (the NO branch from step 156), the requesting channel goes into front queue 88 for the storage device (step 160). From step 154 or step 160 a device busy signal is applied to the requesting channel (step 161) before termination of the process.

Figure 7:
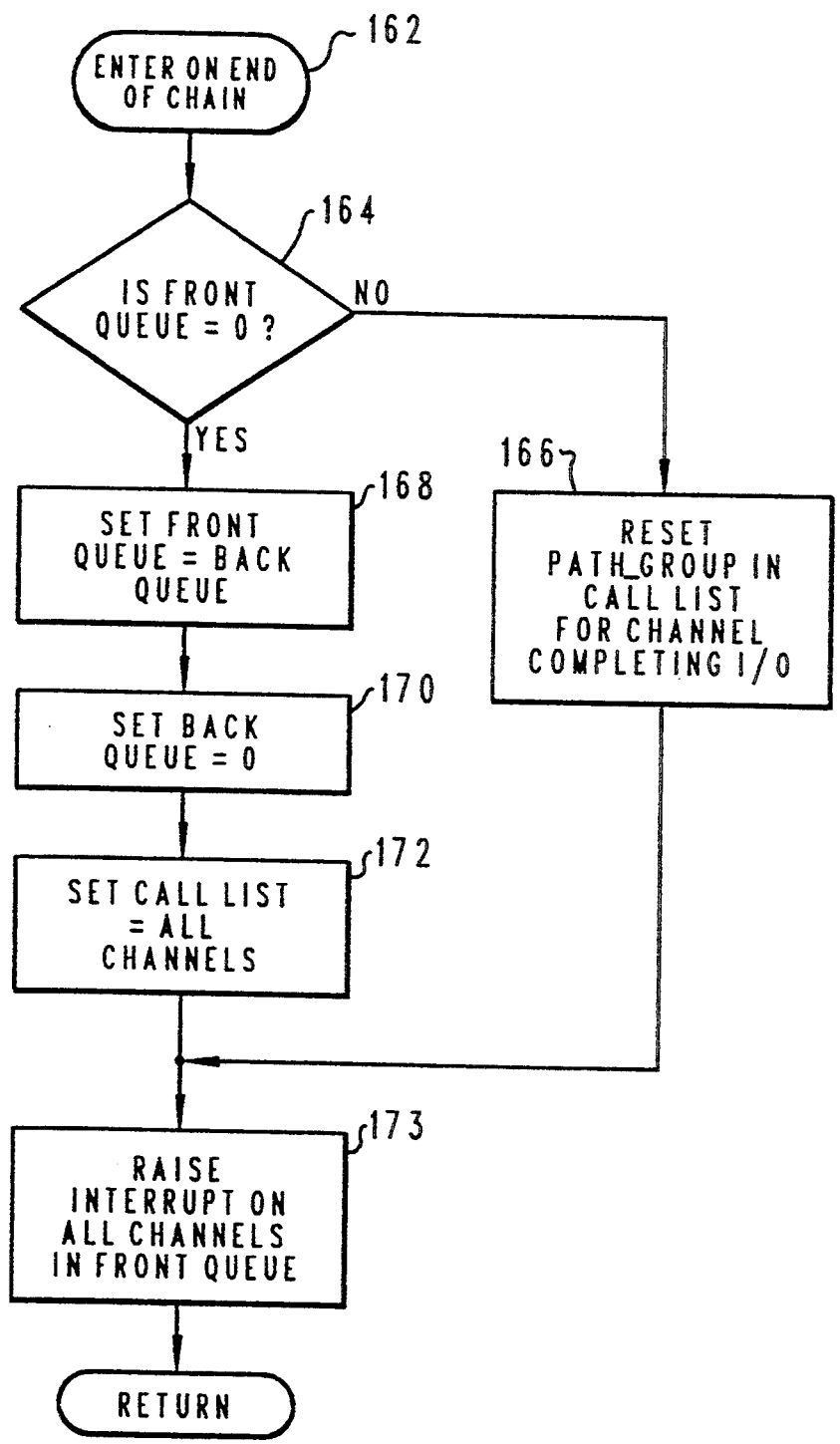
FIG. 7 is a logical flow chart illustrating a programmed response of the storage controller to receipt of the end of chain to an input/output operation.

FIG. 7 illustrates processing of storage device access arbitration upon receipt of an end of chain signal detected at step 162. At step 164, it is determined if the front queue is empty. If the front queue has entries (the NO branch) step 166 is executed to remove the channel completing the Input/Output operation from the call list 9:2 (and any members of the completing channel's path group). If the front queue is empty (the YES branch), step 168 is next executed to move the contents of the back queue into the front queue. Next, with step 170, the back queue is emptied (i.e. set equal to zero). At step 172, the call list 92 is set to include all channels. Finally, from step 172 or step 166, step 173 is executed to raise an interrupt on all channels in the front queue 88. The subprocess is then exited.

FIG. 8 is a logical flow chart illustrating processing by a signal path processor upon a control unit initiated selection. At step 178, storage controller 12 gives an owed device end (ODE) signal to the channel which responded to the interrupt of step 173 or step 181. Then, at step 180, the channel given the ODE is removed from the front queue and the back queue. If the channel is a member of a path group, the remaining members of the path group are removed from the front and the back queue.

FIG. 9 is a logical flow chart further illustrating fail safe protection of the access arbitration process. If a host computer has a channel listed in a front queue to a device, and is unable to respond to interrupts on the channel, the possibility exists that the now dead channel will block promotion of channels in a back queue for the device to the front queue for processing. Accordingly, a way of overriding the front queue is provided. Host main frame computers have long provided for generation of a reset allegiance command. This command is used to initiate the fail safe subprocess (step 182). Step 184 is a decision step determining if an outstanding allegiance exists for the storage device. If so, the subprocess is exited for usual handling of the command. If no allegiance exists, it is taken as indication that the circumstances the subprocess is directed to resolving exist. Along the NO branch from step 184, a device end and error indications are set for all channels in the front queue (step 186). Next, at step 188, the front queue is set equal to the back queue and at step 189, the back queue is emptied. Next, at step 190, the call list of allowed channels is set to include all channels. The subprocess is then exited to normal processing.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system of regulating communication between a plurality of host computers and a plurality of storage devices during periods of contention between host computers for access to a storage device or to a storage controller, wherein the storage controller is connected for data communication to each of the host computers by one of a plurality of channels and is further connected to each of the storage devices for selective establishment of communication between the storage devices and the host computer, the method comprising the steps of:
   initializing an access request block for the storage controller;
   initializing a control counter for each channel;
   responsive to a channel release of the storage controller, indexing the control counter for each channel having a record in the access request block;
   responsive to a channel being denied access after a request for access, entering a record of the request for access in the access request block;
   responsive to a channel obtaining access to the storage controller, reinitializing the control counter for that channel;
   comparing the control counter for each channel against a plurality of thresholds; and
   responsive to results from the comparing step, establishing a mode of operation of the data system relating to preference in access to the storage controller by each channel.

2. A method as set forth in claim 1, further comprising the steps of:
   generating for each storage device a front queue listing channels owed a device end signal for a storage device and a back queue listing channels owed a device end signal for a storage device;
   generating a call list listing channels allowed access to each storage device;
   responsive to receipt by the storage controller of a start input/output signal for a storage device over a particular channel, determining if said particular channel is on the call list;
   responsive to a determination that said particular channel is not on the call list, presenting a device busy signal and listing said particular channel on the back queue for a storage device;
   responsive to a determination that said particular channel is on the call list, further determining if a storage device is available for access;
   responsive to a determination that a storage device is not available for access, listing said particular channel on the front queue for a storage device; and
   responsive to determination that a storage device is available for access, granting access to a storage device by said particular channel.

3. A method as set forth in claim 2, wherein the plurality of thresholds includes three index levels, reached in order of a preferred level, a block demand level and a failure level.

4. A method as set forth in claim 3, wherein the step of establishing a mode of operation of the data system relating to preference in access to the storage controller by a channel further comprises the steps of:
   responsive to the control counter for a particular channel reaching the preferred level, qualifying said particular channel for receipt of a control unit end signal;
   responsive to the control counter for said particular channel reaching the block demand level, blocking access to the storage controller by any channel for which a control counter does not meet the block demand level; and
   responsive to the control counter for said particular channel reaching the failure level, reinitializing the channel counter.

5. A method as set forth in claim 4, further comprising:
   responsive to qualification of a channel for receipt of a control unit end signal, blocking transmission of control unit end signals to channels listed in the access request block.

6. A method as set forth in claim 5, and further comprising:
   responsive to completion of an input/output chain over a selected channel, examining the front queue for each storage device to determine its contents;
   responsive to a front queue for a particular storage-device listing no channels, listing in the front queue for said particular storage device any channels listed in the back queue for said particular storage device, clearing the back queue for said particular storage device and resetting the call list to allow all channels access to said particular storage device;
   responsive to the front queue for said particular storage device listing channels, removing said selected channel completing the input/output chain from the call list; and
   raising an interrupt on all channels listed in the for said particular storage device front queue.

7. A method as set forth in claim 6, and further comprising the steps of:
   presenting a device end signal to a channel responding to the interrupt;
   removing the channel to which the device end was presented from the front queue for said particular storage device; and
   raising an interrupt on all channels listed in the front queue for said particular storage device.

8. A method as set forth in claim 7, wherein sets of channels associated with a host computer are identified to the storage controller by the host computer as a path group and wherein removal of a channel from the front queue for said particular storage device or from the call list results in removal from the front and back queues for said particular storage device or the call list, respectively, of all channels of the path group.

9. A method as set forth in claim 4, and further comprising the steps of:
   counting consecutive occurrences of start input/output requests without subsequent execution of an input/output chain; and
   responsive to said counting reaching a selected threshold, reinitializing all control counters.

10. A method as set forth in claim 2, and further comprising:
    responsive to completion of an input/output chain over a selected channel, examining the front queue for each storage device to determine its contents;
    responsive to a front queue for a particular storage device listing no channels, listing in the front queue for said particular storage device any channels listed in the back queue for said particular storage device, clearing the back queue for said particular storage device and resetting the call list to allow all channels access to said particular storage device; and
    responsive to the front queue for said particular storage device listing channels, removing said selected channel completing the input/output chain from the call list.

11. A method as set forth in claim 1, wherein the plurality of thresholds includes three index levels, reached in order of a preferred level, a block demand level and a failure level.

12. A method as set forth in claim 3, wherein the step of establishing a mode of operation of the data system relating to preference in access to the storage controller by a channel further comprises the steps of:
    responsive to the control counter for a particular channel reaching the preferred level, qualifying said particular channel for receipt of a control unit end signal;
    responsive to the control counter for said particular channel reaching the block demand level, blocking access to the storage controller by any channel for which a control counter does not meet the block demand level; and
    responsive to the control counter for said particular channel reaching the failure level, reinitializing the channel counter.

13. A method in a data processing system of regulating communication between a plurality of host computers and a plurality of storage devices during periods of contention between host computers for access to a storage device or to the a storage controller, wherein the a storage controller is connected for data communication to each of the host computers by at least a first channel and is further connected to each of the storage devices for selective establishment of communication between the storage devices and the host computer, the method comprising the steps of:
    generating a front queue listing channels owed a device end signal for each storage device and a back queue listing channels owed a device end signal for each storage device;
    generating a call list listing channels allowed access to each storage device;
    responsive to receipt by the storage controller of a start input/output signal for a selected storage device over a particular channel, determining if said particular channel is on the call list;
    responsive to a determination that said particular channel is not on the call list, presenting a device busy signal and listing said particular channel on the back queue for said selected storage device;
    responsive to a determination that said particular channel is on the call list, further determining if said selected storage device is available for access;
    responsive to a determination that said selected storage device is not available for connection, listing said particular channel on the front queue for said selected storage device; and
    responsive to determination that said selected storage device is available for access, granting access to said selected storage device by said particular channel.

14. A method as set forth in claim 13, further comprising the steps of:
    initializing an access request block for the storage controller;
    initializing a control counter for each channel;
    responsive to a channel releasing the storage controller, indexing the control counter for each channel having a record in the access request block;
    responsive to a channel being denied access after a request for access, listing the channel in that access request block;
    responsive to a channel obtaining access to the storage controller, reinitializing the control counter for that channel;
    comparing the control counter for each channel against a plurality of thresholds; and
    responsive to results from the comparing step, establishing a mode of operation of the data system relating to preference in access to the storage controller by each channel.

15. A method as set forth in claim 14, and further comprising the steps of:
    responsive to completion of an input/output chain over a selected channel, examining the front queue for each storage device queue to determine its contents;
    responsive to the front queue for a particular storage device listing no channels, listing in the front queue for said particular storage device any channels listed in the back queue for said particular storage device, clearing the back queue for said particular storage device and resetting the call list to allow all channels access to said particular storage device;
    responsive to said selected front queue for said particular storage device listing channels, removing the channel completing the input/output chain from the call list; and
    raising an interrupt for all channels listed in said front queue for said particular storage device.

16. A method as set forth in claim 15, and further comprising the steps of:
  presenting a device end signal to a channel first responding to the interrupt;
  removing the channel to which the device end was presented from the front queue for said particular storage device; and
  raising an interrupt on all channels listed in the front queue for said particular storage device.

17. A method as set forth in claim 16, wherein sets of channels associated with a host computer are identified to the storage controller by the host computer as a path group and wherein removal of a channel from the front queue for said particular storage device or from the call list results in removal from the front and back queues for said particular storage device or the call list, respectively, of all channels of the path group.

18. A method as set forth in claim 7, wherein the plurality of thresholds includes three index levels, reached in order of a preferred level, a block demand level and a failure level.

19. A method as set forth in claim 18, wherein the step of establishing a mode of operation of the data system relating to preference in access to the storage controller by a channel further comprises the steps of:
  responsive to the control counter for a particular channel reaching the preferred level, qualifying the said particular channel for receipt of a control unit end signal;
  responsive to the control counter for said particular channel reaching the block demand level, denying access to the storage controller by any channel for which a control counter does not meet the block demand level; and
  responsive to the control counter for said particular channel reaching the failure level, reinitializing the channel counter.

20. A method as set forth in claim 14, wherein the plurality of thresholds includes three index levels, reached in order of a preferred level, a block demand level and a failure level.

21. A method as set forth in claim 20, wherein the step of establishing a mode of operation of the data system relating to preference in access to the storage controller by a channel further comprises the steps of:
  responsive to the control counter for a particular channel reaching the preferred level, qualifying said particular channel for receipt of a control unit end signal;
  responsive to the control counter for said particular channel reaching the block demand level, denying access to the storage controller from any channel for which a control counter does not meet the block demand level; and
  responsive to the control counter for said particular channel reaching the failure level, reinitializing the channel counter.

22. A method as set forth in claim 21, comprising the steps:
  responsive to qualification of a channel for receipt of a control unit end signal, blocking transmission of control unit end signals to channels listed in the access request block.

23. A method as set forth in claim 14, and further comprising the steps of:
  responsive to completion of an input/output chain over a selected channel, examining the front queue for each storage device to determine its contents;
  responsive to a front queue for a particular storage device listing no channels, listing in the front queue for said particular storage device any channels listed in the back queue for said particular storage device, clearing the back queue for said particular storage device and resetting the call list to allow all channels access to said particular storage device;
  responsive to the front queue for said particular storage device listing channels, removing said selected channel completing the input/output chain from the call list; and
  raising an interrupt on all channels listed in the front queue for said particular storage device.

24. A method as set forth in claim 14, and further comprising the steps of:
  counting consecutive occurrences of start input/output requests without subsequent execution of an input/output chain; and
  responsive to said counting reaching a selected threshold, reinitializing all control counters.

25. A data processing system for regulating access to system resources, the data processing system comprising:
  a storage controller;
  a plurality of storage devices connected to the storage controller;
  a plurality of host computers, each host computer being connected for data communication to the storage controller by at least a first channel;
  memory storing an access request block and a control counter for each channel;
  means responsive to a channel releasing access to the storage controller for indexing the control counter for each channel having a record in the access request block;
  means responsive to a channel being denied access to the storage controller after a request for access for entering a record of that channel in the access request block;
  means responsive to a channel obtaining access to the storage controller for reinitializing the control counter for that channel and removing the record of that channel from the access request block;
  means for comparing the control counter for each channel against a plurality of thresholds; and
  means responsive to results from the means for comparing for establishing preference for access by channels to the storage controller.

26. A data processing system as set forth in claim 25, further comprising:
  means for generating a front queue listing channels owed a device end signal for each storage device;
  means for generating a back queue listing channels owed a device end signal for each storage device;
  means for listing channels allowed access to each storage device;
  means responsive to receipt by the storage controller of a start input/output signal for a storage device over a particular channel for determining from the listing if said particular channel is allowed access to said particular storage device;
  means responsive to a determination that said particular channel is not on the list of channels allowed access to each storage device for listing said particular channel on the back queue for a selected storage device;
  means responsive to a determination that said particular channel is on the list of channels allowed access to each storage device for determining said selected storage device is available for access;

means responsive to a determination that said selected storage device is unavailable for access for listing said selected channel on the front queue for said selected storage device; and means responsive to determination that said selected storage device is available for access for establishing access to said selected storage device by said particular channel.

27. A data processing system as set forth in claim 26, wherein the plurality of thresholds includes three index levels progressing from a preferred level to a block demand level and a lastly to a failure level.

28. A data processing system as set forth in claim 27, wherein the means for establishing preference for access further comprises:

means responsive to the control counter for a particular channel reaching the preferred level for qualifying a particular channel for receipt of a control unit end signal;

means responsive to the control counter for said particular channel reaching the block demand level for denying access to the storage controller by any channel for which a control counter does not meet the block demand level; and means responsive to the control counter for the channel reaching the failure level for reinitializing the channel counter.

29. A data processing system as set forth in claim 28, and further comprising:

means responsive to completion of an input/output chain over a selected channel for reading the front queue for each storage device;

means responsive to a front queue for a particular storage device listing no channels for moving to the front queue for said particular storage device any channels listed in the back queue for said particular storage device, clearing the back queue for said particular storage device and resetting the list of channels allowed access to each storage device to allow all channels;

means responsive to the front queue for said particular storage device listing channels for removing said selected channel completing the input/output chain from the list of channels allowed access to each storage device; and means for raising an interrupt on all channels listed in the front queue for said particular storage device.

30. A method as set forth in claim 29, and further comprising:

means for presenting a device end signal to a channel responding to the interrupt;

means for removing the channel to which the device end was presented from the front queue for said particular storage device and the back queue for said particular storage device; and means for raising an interrupt on all channels listed in the front queue for said particular storage device.

31. A data processing system as set forth in claim 30, wherein sets of channels associated with a host computer are identified to the storage controller by the host computer as a path group and wherein removal of a channel from the front queue for said particular storage device or from the list of channels allowed access to each storage device results in removal from the front and back queues for said particular storage device or the list of channels allowed access to each storage device, respectively, of all channels of the path group.

32. A method as set forth in claim 28, and further comprising the steps of:

means for counting consecutive occurrences of start input/output requests without subsequent execution of an input/output chain; and means responsive to said counting reaching a selected threshold for reinitializing all control counters.

33. A data processing system as set forth in claim 26, and further comprising:

means responsive to completion of an input/output chain over a selected channel for reading the front queue for each storage device;

means responsive to a front queue for a particular storage device listing no channels for moving any channels listed in the back queue for said particular storage device to the front queue for said particular storage device, clearing the back queue for said particular storage device and resetting the list of channels allowed access to each storage device to allow all channels access to said particular storage device; and means responsive to the front queue listing channels for removing said selected channel just completing the input/output chain from the list of channels allowed access to each storage device.

34. The data processing system of claim 30 and further comprising means responsive to a reset allegiance command for clearing the front queue for said particular storage device, then moving the back queue for said particular storage device into the front queue for said particular storage device and setting the list of channels allowed access to each storage device to allow all channels access to said particular storage device.

35. A data processing system as set forth in claim 25, wherein the plurality of thresholds includes three index levels progressing from a preferred level to a block demand level and lastly to a failure level.

36. A data processing system as set forth in claim 35, wherein the means for establishing preference for access further comprises:

means responsive to the control counter for a particular channel reaching the preferred level for qualifying said particular channel for receipt of a control unit end signal;

means responsive to the control counter for said particular channel reaching the block demand level for denying access to the storage controller by any channel for which a control counter does not meet the block demand level; and means responsive to the control counter for said particular channel reaching the failure level for reinitializing the channel counter.

37. A method in a data processing system of regulating communication between a plurality of host computers and a plurality of shared devices during periods of contention between host computers for access to a shared device or to shared device controller, wherein the a shared device controller is connected for data communication to each of the host computers by a plurality of channels and is further connected to each of the shared devices for selective establishment of communication between the shared devices and the host computer, the method comprising the steps of:

responsive to a request for access to the shared device controller during a period of contention for access, aging a request for access to the shared device controller from each channel generating such a request which is denied access to the shared device controller among said plurality of channels by accumulating a count of occasions of denial of access to the shared device controller for each channel among said plurality of channels during a period of contention for access to the shared device controller;

responsive to said aging of each request, giving preference for access to the shared device controller to the channel among said plurality of channels having requests of greater age responsive to said accumulated count of occasions of denial of access to the shared device controller for each channel among said plurality of channels for giving preference for access to the shared device controller to those channels among said plurality of channels having higher accumulated counts; and responsive to occurrence of a period of contention for access to a shared device, peremptorily denying access to channels with prior access until all channels requesting access have been served.

38. A method as set forth in claim 37, wherein access of those channels among said plurality of channels having higher accumulated counts is unordered.

* * * * *

UNITED STATES PATENT AND TRADEMARK OFFICE
CERTIFICATE OF CORRECTION

PATENT NO. :   5,428,796
DATED      :   June 27, 1995
INVENTOR(S) :  Iskiyan et al.

It is certified that error appears in the above-indentified patent and that said Letters Patent is hereby corrected as shown below:

Column 3, line 44:  change "untilled" to --unfilled--

Column 6, line 19:  change "48" to --46--

Column 10, line 39:  change "15:2" to --152--

Column 10, line 56:  change "9:2" to --92--

Column 13, line 66:  delete "a" after "wherein the"

Signed and Sealed this

Third Day of September, 1996

*Attest:*

BRUCE LEHMAN

*Attesting Officer*      *Commissioner of Patents and Trademarks*